(12) United States Patent
Nolte

(10) Patent No.: US 12,523,412 B2
(45) Date of Patent: Jan. 13, 2026

(54) METHOD OF DEFROSTING A HEAT PUMP DEVICE AS WELL AS A HEAT PUMP DEVICE

(71) Applicant: Stiebel Eltron Gmbh & Co. KG, Holzminden (DE)

(72) Inventor: Hubert Nolte, Hoxter (DE)

(73) Assignee: Stiebel Eltron GmbH & Co.KG, Holzminden (DE)

( * ) Notice: Subject to any disclaimer, the term of this patent is extended or adjusted under 35 U.S.C. 154(b) by 440 days.

(21) Appl. No.: 17/943,492

(22) Filed: Sep. 13, 2022

(65) Prior Publication Data

US 2023/0003435 A1 Jan. 5, 2023

Related U.S. Application Data

(63) Continuation of application No. 15/403,541, filed on Jan. 11, 2017, now abandoned.

(51) Int. Cl.
| | |
|---|---|
| *F25D 21/08* | (2006.01) |
| *F24D 17/02* | (2006.01) |
| *F24H 1/20* | (2022.01) |
| *F24H 4/04* | (2006.01) |
| *F24H 9/20* | (2022.01) |
| *F24H 15/136* | (2022.01) |
| *F24H 15/37* | (2022.01) |
| *F24H 15/375* | (2022.01) |
| *F25B 30/02* | (2006.01) |
| *F24H 15/20* | (2022.01) |
| *F24H 15/281* | (2022.01) |
| *F24H 15/38* | (2022.01) |

(Continued)

(52) U.S. Cl.
CPC ............. *F25D 21/08* (2013.01); *F24D 17/02* (2013.01); *F24H 1/202* (2013.01); *F24H 4/04* (2013.01); *F24H 9/2021* (2013.01); *F24H 15/136* (2022.01); *F24H 15/37* (2022.01); *F24H 15/375* (2022.01); *F25B 30/02* (2013.01); *F24H 15/20* (2022.01); *F24H 15/281* (2022.01); *F24H 15/38* (2022.01); *F24H 15/421* (2022.01); *F25B 47/02* (2013.01); *F25B 2339/047* (2013.01)

(58) Field of Classification Search
CPC .......... F25D 21/08; F24D 17/02; F25B 30/02; F25B 47/02; F25B 2339/047; F24H 15/375; F24H 15/37; F24H 15/136; F24H 1/202; F24H 4/04; F24H 9/2021; F24H 15/20; F24H 15/421; F24H 15/281; F24H 15/38
See application file for complete search history.

(56) References Cited

U.S. PATENT DOCUMENTS

| | | | |
|---|---|---|---|
| 4,380,156 A | 4/1983 | Ecker | |
| 4,517,807 A * | 5/1985 | Harnish | F24D 17/02 165/241 |

(Continued)

*Primary Examiner* — Larry L Furdge
(74) *Attorney, Agent, or Firm* — Brooks Kushman P.C.

(57) ABSTRACT

A system and method of defrosting a heat pump device including a water tank, a heat exchanger, an electrical heating element, an evaporator, a fan for the evaporator, and a control unit. In a first operating mode, the heat pump device is controlled to heat water inside the water tank. In a second operating mode, the electrical heating element is manually activated to additionally heat the water inside the water tank. In a third operating mode, the electrical heating element is automatically activating to heat the water in the storage tank.

19 Claims, 1 Drawing Sheet

(51) Int. Cl.
*F24H 15/421* (2022.01)
*F25B 47/02* (2006.01)

(56) References Cited

U.S. PATENT DOCUMENTS

| | | |
|---|---|---|
| 5,052,186 A | 10/1991 | Dudley et al. |
| 5,495,551 A | 2/1996 | Robinson, Jr. et al. |
| 5,772,113 A | 6/1998 | Gerstmann et al. |
| 6,213,405 B1 | 4/2001 | Spiegel |
| 2002/0100447 A1 | 8/2002 | Biess |
| 2002/0104325 A1 | 8/2002 | Mandel et al. |
| 2003/0000233 A1 | 1/2003 | Mazereeuw |
| 2003/0029178 A1 | 2/2003 | Zenter et al. |
| 2003/0115892 A1 | 6/2003 | Fu et al. |
| 2003/0116637 A1 | 6/2003 | Ellingham |
| 2003/0140638 A1 | 7/2003 | Arshansky et al. |
| 2003/0178408 A1 | 9/2003 | Ghent |
| 2003/0182951 A1 | 10/2003 | Rafalovich et al. |
| 2004/0118933 A1 | 6/2004 | Readio et al. |
| 2007/0074523 A1 | 4/2007 | Takegami et al. |
| 2012/0060521 A1 | 3/2012 | Roetker et al. |
| 2015/0253049 A1* | 9/2015 | Tsai ........................ F25B 47/02 62/82 |
| 2019/0338963 A1* | 11/2019 | Nolte .................... F24H 15/375 |

* cited by examiner

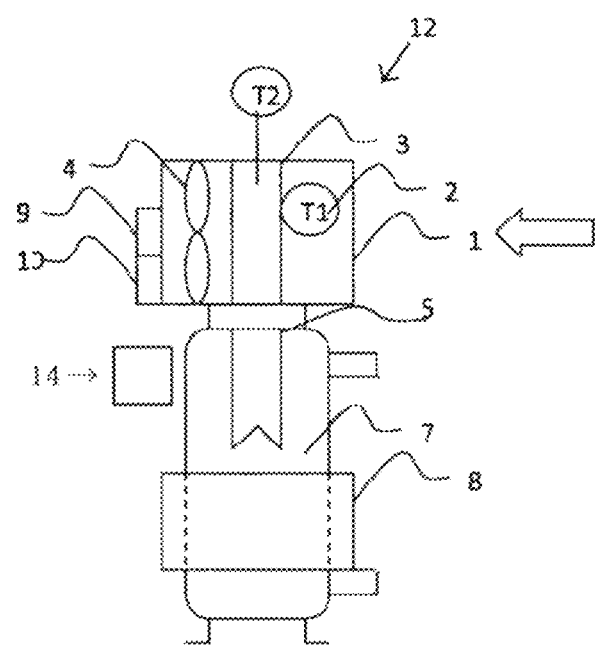

METHOD OF DEFROSTING A HEAT PUMP DEVICE AS WELL AS A HEAT PUMP DEVICE

CROSS-REFERENCE TO RELATED APPLICATIONS

This application is a continuation of U.S. application Ser. No. 15/403,541 filed Jan. 11, 2017, the disclosure of which is hereby incorporated in its entirety by reference herein.

TECHNICAL FIELD

The present invention relates to a method of deicing or defrosting a heat pump device as well as a heat pump device.

BACKGROUND AND SUMMARY

It is noted that citation or identification of any document in this application is not an admission that such document is available as prior art to the present invention.

If a heat pump device is operated at low temperature conditions, water can condense on the evaporator of the heat pump device. If the outside temperature is high enough, the freezing agent is above the freezing temperature. If the outside temperature, however, drops, then the refrigerant circuit can be operating at a temperature below the freezing temperature and the water which has condensed on the evaporator is starting to freeze such that a hoar frost build-up is starting at the evaporator.

In particular, the water which is present between the fins of the evaporator starts to freeze such that the distance between adjacent fins, through which typically air is streaming, is reduced and the amount of air which can stream there through is reduced. In the worst case, the air stream is blocked such that no air can stream through the evaporator. In such a situation, a deicing or defrosting is required.

For deicing or defrosting the evaporator, the compressor can be switched on and off in a cyclic manner. During the deicing or defrosting, the compressor is stopped such that the freezing agent is not flowing any more through the refrigerant circuit. On the other hand, the fan of the evaporator is still operating such that air is streaming through the evaporator and the ice between the fins is deiced or defrosted by the energy which is still present in the outside air. This deicing operation is only possible if the air temperature is above the freezing temperature. On the other hand, if the air is below 2° C. (35.6° F.), the defrosting operation can have a negative impact on the comfort of the user of the heat pump device as the ability of the heat pump device to produce sufficient hot water is reduced, i.e., the time required to heat sufficient water is increasing.

It should further be noted that the rate at which ice or hoar frost build-up is present at the fins of the evaporator is not only dependent on the temperature of the outside air, but also the humidity of the air. In other words, the heat pump device must react differently to low temperatures which have a low air humidity than compared to low temperatures which also have a high air humidity. In the first case, the heat pump device may initiate a defrosting of the evaporator while a defrosting is not yet required.

BRIEF DESCRIPTION OF THE DRAWINGS

FIG. 1 shows a schematic representation of a hot water heater having a heat pump device according to an embodiment of the disclosure.

DETAILED DESCRIPTION

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 1 shows a schematic representation of a hot water heater 12 that has a heat pump device 1 and a heating element 5 for heating the water. The heat pump device HP is implemented as an air/water heat pump device 1. The hot water heater 12 includes a storage tank 7 adapted to store tap water or drinking water, a plate heat exchanger, in particular a roll bond (plate) heat exchanger 8 which can be arranged around the storage tanks 7. Inside the storage tank 7, an electrical heating element 5. HE, can be arranged. The heat pump device 1 furthermore comprises an evaporator 3 with a fan 4 and a compressor 14. An expansion valve and a filter dryer are not shown in FIG. 1.

Furthermore, the heat pump device 1 comprises a first temperature sensor T1 which is measuring the temperature of the air in or at the evaporator which is sucked in by the fan 4 as well as a second temperature sensor T2 which is arranged adjacent to or at the evaporator 3. The second temperature sensor T2 is used to detect a hoar frost or ice build-up at the evaporator 3.

The heat pump device 1 furthermore comprises a control unit 9 which is adapted to control the operation of the electrical heating element 5 in order to control the temperature of the water inside the storage tank 7. Optionally, the heat pump device 1 may comprise a user interface or an operating element 10. By means of the user interface or the operating element 10, the user can choose the set value of the temperature of the water inside the storage tank. Moreover, the user interface or the operating element 10 can be used by the user to initiate an additional heating of the water inside the storage tank by means of the heating element 5.

The electrical heating element 5 can be implemented as a tubular heating element or as a heating rod. The roll bond heat exchanger 8 (as part of the heat pump) is used as primary heating source for heating the water inside the storage tank 7. The heating element 5 is used as secondary heating element e.g., for situations where the roll bond heat exchanger 8 is not able to provide sufficient energy to sufficiently heat the water inside the storage tank 7.

It should be noted that the primary heating via the roll bond heat exchanger 8 is more energy sufficient than the heating via the secondary electrical heating element, namely the heating element 5.

The heat pump device can be operated in different operating modes. The different operating modes can for example be activated by the control unit 9 in particular depending on the temperature as detected by the second temperature sensor T2 as well as the first temperature sensor T1.

The second temperature sensor T2 is used to detect the hoar frost build-up at the evaporator. The temperature as sensed by the second temperature sensor T2 is compared in the control unit 9 with a stored set value. If the temperature as detected by the second temperature sensor T2 is below the set value, the heating operation of the heat pump device is stopped and the defrosting operation is initiated. The defrosting operation is continued until the hoar frost build-up at the evaporator is removed. This is in particular performed by melting the ice on the evaporator.

As mentioned above, the defrosting or deicing can be performed by deactivating the compressor 14 while the fan 4 of the evaporator 3 is still in operation until the temperature as detected by the second temperature sensor T2 is above 0° C. For example, if the temperature as detected by the second temperature sensor T2 is for example 3° C., then the compressor can be activated again and thus the heating operation of the heat pump device can be activated again. The time required for defrosting or deicing the evaporator will depend on the amount of ice or hoar frost build-up on the evaporator.

The normal operating mode can be considered as the first operating mode. During this operating mode (heating operating mode), the heat pump device is heating the water inside the storage tank 7 via the roll bond heat exchanger 8 and the heating element 5 is deactivated.

In a second operating mode, the user may manually activate the operation of the heating element 5 for example via the user interface or operating unit 10. Via the heating element 5, a part of the water inside the storage tank is heated one time. If the water temperature inside the storage tank 7 corresponds to the desired value, then the heating element 5 is deactivated again and only the heat pump device is heating the water inside the storage tank 7 via the roll bond heat exchanger 8.

The control unit 9 activates a third operating mode if the temperature as detected by the first temperature sensor T1 is below a set value which can be for example 6° C. In the third operating mode, the operation of the heating element 5 is controlled by the control unit 9. The control unit 9 controls the operation of the heating element. 5 in particular if a second condition is fulfilled. The heating element 5 is only then activated automatically by the control unit 9 if the heat pump device 1 is not able to produce sufficient hot water via the roll bond heat exchanger 8. In addition or alternatively, the heating element 5 is activated via the control unit 9 if the time during which the deicing operation is activated exceeds a time limit, for example like 30 minutes. If this time limit has lapsed, then the control unit 9 activates the operation of the heating element 5 and the operation is continued until the heating requirement is fulfilled. Accordingly, the heating requirement may relate to a normal operation of the heat pump device with an increased requirement for hot water or alternatively if the deicing operation is continued beyond a set time period.

In addition or alternatively, the control unit 9 can also activate the operation of the heating element 5 if the defrosting operation is activated several times within a set time period. For example, if the defrosting operation is activated five times during two hours, the control unit 9 activates the operation of the heating element 5 to heat the water inside the storage tank. This activation of the heating element can continue until the number of activations of the defrosting unit within a set time limit has decreased.

If the control unit 9 deactivates the heating operation of the heat pump device via the roll bond heat exchanger 8, the automatic operation of the heating element 5 via the control unit 9 is also deactivated.

If the air temperate as determined by the second temperature sensor T2 has increased for example up to 8° C., the third operating mode (automatic operation of the heat element) is deactivated such that the heating element can only be manually activated via the user interface or operating unit 10.

Therefore, the on and off switching of the manual and automatic operation of the heating element includes a hysteresis of for example 2° C.

The control unit 9 activates a fourth operating mode if the air temperature as determined by the second temperature sensor T2 is below 2° C. and the necessity of a defrosting operation is detected. If the defrosting operation is continuing for more than 30 minutes, the fan 4 of the evaporator 3 is deactivated and the control unit 9 activates the operation of the heating element 5 until a temperature control device (thermostat) of the heat pump device together with the control unit 9 deactivates the operation of the heating element 5. During this operating mode, the operation of the heat pump device is deactivated for a predetermined time interval. The deactivation of the heat pump device operation starts with the deactivation of the fan 4. The time period of this deactivation can be for example up to 4 hours. If the temperature of the air flowing through the evaporator 3 as determined by the first temperature sensor T1 is above 6° C., the time period for the deactivation of the heat pump device 1 is reduced. If the air temperature as determined by the second temperature sensor T2 is above 8° C. or if a power outage occurs, the heating operation of the heat pump device is activated again.

If the temperature of the air as determined by the first temperature sensor T1 is below-2° C., the heating operation of the heat pump device is deactivated and the automatic operation of the heating element 5 is activated. This operation is deactivated again when the temperature as determined by the first temperature sensor T1 is >0° C.

According to an aspect of the invention, the fan 4 is activated for 5 to 10 seconds before the temperature sensor T1 determines the temperature of the air flowing through the evaporator. This is advantageous as this will allow a more accurate measuring of the air temperature. The temperature as measured by the temperature sensor T1 is used to decide whether or not the compressor can be activated again and the heating operation of the heat pump device can be reactivated again.

In an aspect of the invention, the fan 4 can be activated before the temperature sensor T1 detects the air temperature of the air flowing through the evaporator in case the heat pump device has been deactivated.

In a further aspect of the invention, the last temperature value which was measured by the temperature sensor T1 during an active operation of the fan can be used when the heating operation of the heat pump has been deactivated in order to determine whether or not the compressor is to be activated again.

In the following table, different operating modes of the heat pump device HP and the electrical heating element HE are depicted:

| Air temperature | HP heating | HP defrosting | HE manual | HE auto | HP blocked = f(defrosting) | HP blocked |
|---|---|---|---|---|---|---|
| >6° C. | X | X | X | | | |
| >6° C., >2° C. | X | X | X | X | | |
| <3° C. >0° C. | X | X | X | X | X | |
| <−2° C. | | | X | X | | X |

While this invention has been described in conjunction with the specific embodiment outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:

1. A hot-water heater comprising:
a water tank configured to store water;
an electrical heating element disposed inside the water tank;
a heat pump including:
a compressor,
a condenser arranged to heat water within the water tank,
an evaporator, and
a fan associated with the evaporator;
a first temperature sensor configured to sense ambient air temperature;
a second temperature sensor configured to sense a temperature of the evaporator; and
a control unit programmed to:
in response to the temperature of the evaporator indicating ice formation, initiate defrost by deactivating the compressor and continuing activation of the fan, and
in response to expiration of a time period and the temperature of the evaporator still indicating ice, deactivate the fan, continue deactivation of the compressor, and activate the electrical heating element to heat the water until the temperature of the water reaches a set point.

2. The hot-water heater of claim 1, wherein the control unit is further programmed to, in response to the defrost being initiated more than a threshold number of times within a set time period, inhibit operation of the heat pump until the temperature of the water reaches the set point such that the water is heated with only the electrical heating element.

3. The hot-water heater of claim 1, wherein the control unit is further programmed to, in response to the defrost being initiated more than a threshold number of times within a set time period, inhibit operation of the heat pump for a time interval.

4. The hot-water heater of claim 3, wherein a duration of the time interval is based on data from the first sensor.

5. The hot-water heater of claim 4, wherein the duration of the time interval is reduced responsive to the ambient air temperature exceeding six degrees Celsius.

6. The hot-water heater of claim 1, wherein the control unit is further programmed to, in response to the ambient air temperature exceeding eight degrees Celsius, exit defrost and activate the compressor.

7. The hot-water heater of claim 1, wherein the control unit is further programmed to, in response to a power outage, exit defrost.

8. A hot-water heater comprising:
a water tank configured to store water;
an electrical heating element disposed inside the water tank;
a heat pump including:
a compressor,
a condenser arranged to heat water within the water tank,
an evaporator, and
a fan associated with the evaporator;
a first temperature sensor configured to output data indicative of the ambient air temperature; and
a second temperature sensor configured to output data indicative of a temperature of the evaporator; wherein the hot water heater is configured to
operate the heat pump in a first mode when the ambient air temperate exceeds a first threshold,
operate the heat pump is a second mode when the ambient air temperate is less than the first threshold and greater than a second threshold,
operate the beat pump in a third mode when the ambient air temperate is less than the second threshold and greater than a third threshold,
operate the heat pump in a fourth operating mode when the ambient air temperate is less than a fourth threshold,
in response to the heat pump being in the second mode, heat the water with only the heat pump by activating the compressor and the fan, and, responsive to the heat pump failing to heat the water to a set point within a threshold time, active the electric heater to heat the water with both the heat pump and the electric heater,
in response to the heat pump being in the second mode and the data of the second sensor indicating ice formation on the evaporator, initiate defrost by deactivating the compressor and continuing activation of the fan, and
in response to expiration of a time period beginning with initiation of defrost and the data of the second sensor still indicating ice formation on the evaporator, deactivate the fan, continue deactivation of the compressor, and activate the electrical heating element to heat the water until the set point is achieved.

9. The hot-water heater of claim 8, wherein the first threshold is six degrees Celsius, the second threshold is two degrees Celsius, the third threshold is zero degrees Celsius, and the fourth threshold is negative two degrees Celsius.

10. The hot-water heater of claim 8, wherein the hot water heater is further configured to,
in response to the heat pump being in the third mode and the data of the second sensor indicating ice formation on the evaporator, start a timer and initiate the defrost by deactivating the compressor and activating the fan, and
in response to expiration of another period of time and the temperature of the data of the second sensor still indicating ice formation on the evaporator, deactivate the fan, continue deactivation of the compressor, and activate the electrical heating element to heat the water until the set point is achieved.

11. The hot-water heater of claim 10, wherein the hot water heater is further configured to, during the third mode, inhibit operation of the heat pump until the temperature of the water reaches the set point in response to the defrost being initiated more than a threshold number of times within a set time period.

12. The hot-water heater of claim 8, wherein the hot water heater is further configured to inhibit manual activation of the electrical heating element when in the first mode and permitting the manual activation of the electrical heating element when in the second and third modes.

13. The hot-water heater of claim 8, wherein the hot water heater is further configured to deactivate the heat pump and heat the water with the electrical heating element when in the fourth mode.

14. The hot-water heater of claim 8, wherein the hot water heater is further configured to, during the second mode, inhibit operation of the heat pump until the temperature of the water reaches the set point in response to the defrost being initiated more than a threshold number of times within a set time period.

15. The hot-water heater of claim 8, wherein the hot water heater is further configured to, during the second mode, inhibit operation of the heat pump for a time interval in response to the defrost being initiated more than a threshold number of times within a set time period.

16. The hot-water beater of claim 15, wherein a duration of the time interval is based on the data from the first sensor.

17. A method of operating a hot-water heating having a heat pump and an electrical heating element, the method comprising:
  in response to an evaporator temperature indicating ice, defrosting the evaporator by deactivating a compressor of the heat pump and circulating air through the evaporator with a fan; and
  in response to expiration of a period of time and the evaporator temperature still indicating ice, deactivating the fan, continuing deactivation of the compressor, and activating the electrical heating element to heat the water until the water temperature reaches a set point.

18. The method of claim 17 further comprising, in response to the defrost being initiated more than a threshold number of times within a set time period, inhibiting operation of the heat pump until the water temperature reaches the set point.

19. The method of claim 17 further comprising, in response to the defrost being initiated more than a threshold number of times within a set time period, inhibiting operation of the heat pump for a time interval that is based on the ambient air temperature.

* * * * *